United States Patent [19]

DeHaeck

[11] 4,021,637
[45] May 3, 1977

[54] FLUX-CORED WIRES FOR ELECTROGAS WELDING

[75] Inventor: Robert J. DeHaeck, St. Pieters-Kapelle, Belgium

[73] Assignee: La Soudure Electrique Autogene, Procedes Arcos, Anderlecht, Belgium

[22] Filed: Aug. 29, 1975

[21] Appl. No.: 609,042

[30] Foreign Application Priority Data

Sept. 6, 1974 Belgium ............................. 148259

[52] U.S. Cl. ............................. 219/146; 219/73 R; 219/126
[51] Int. Cl.[2] .......................................... H05B 7/07
[58] Field of Search ................ 219/73 R, 146, 126; 148/24

[56] References Cited

UNITED STATES PATENTS

| | | | |
|---|---|---|---|
| 3,177,340 | 4/1965 | Danhier | 219/146 |
| 3,825,721 | 7/1974 | Carroll | 219/146 |
| 3,866,015 | 2/1975 | Matsumoto | 219/146 |
| 3,868,491 | 2/1975 | Ito | 219/146 |
| R26,611 | 6/1969 | Claussen | 219/146 |

FOREIGN PATENTS OR APPLICATIONS 1,391,581   4/1975   United Kingdom ............... 219/146

*Primary Examiner*—E. A Goldberg
*Attorney, Agent, or Firm*—Jackson, Jackson & Chovanes

[57] ABSTRACT

In flux-cored wire electrodes for vertical automatic welding, from bottom to top, there is an electric arc under gaseous protection, the wires having diameters of 1 to 4 mm and generally shaped internally in any configuration, such as tubular, heart-shaped and composite, characterized by a sheath of steel strip, and a powdered filling flux most preferably including the following ingredients in qualitative and quantitative composition by powder weight:

| | |
|---|---|
| Iron powder | 73% |
| Silicofluoride of potassium ($K_2SiF_6$) | 4% |
| Cryolite ($Na_3AlF_6$) | 2% |
| Nickel powder | 3% |
| Ferro-molybdenum (at 65 up to 75%) | 0.8% |
| Refined ferromanganese (85 up to 90%) | 9.9% |
| Ferrosilicon (45%) | 1% |
| Ferrotitanium (30%) | 0.5% |
| Micaceous iron oxide | 1% |
| Fine silica | 4% |
| Silicocalcium (SiCa) | 0.8% |
| | 100.0% |

The flux-cored wires most preferably have a filling coefficient of 32 grams of powder weight per 100 grams of strip.

5 Claims, 2 Drawing Figures

U.S. Patent  May 3, 1977  4,021,637

FLUX-CORED WIRES FOR ELECTROGAS WELDING

DISCLOSURE OF INVENTION

The present invention belongs to the field of welding processes grouped under the name "electrogas".

Figure 1:
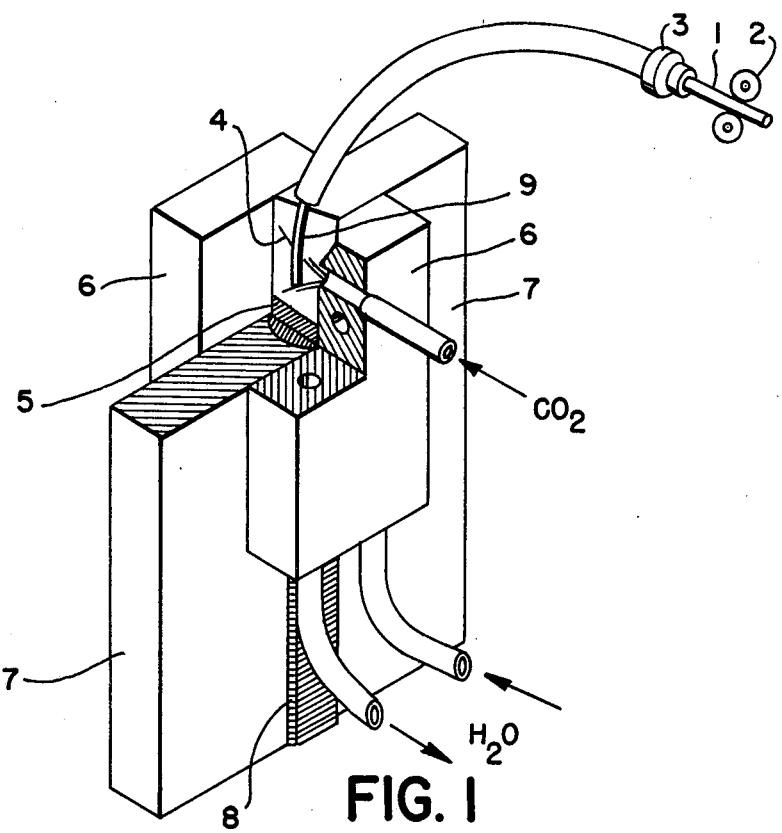

Electrogas welding is well known and is an automatic arc process with gaseous protection, for vertical seams between metallic work pieces, by means of one or several wires acting as fusible electrodes generally flux-cored (see FIG. 1).

In this process the weld bead grows vertically, generally from bottom to top, resulting from the fusion by the arc or arcs of the consumble electrodes, in a prismatic cavity confined on the one hand by cooled damming shoes, and on the other hand by the edges of the plates to be welded, either chamfered or straight.

As in all the arc welding processes operating by melting and depositing metal, the results which can be expected depend essentially on a compromise between enough penetration to produce the anchorage at the bead without "sticking" it on the work, on the one hand, and too much dilution of the base metal in the heat affected zone which could cause brittleness in the vicinity of the welded joint, on the other.

This compromise is obtained by more or less mastering the thermal conditions under which the solidification of the molten materials, such as weld deposits, flux, etc., takes place after their mixing, or more precisely the manner by which the heat exchanges occur in time between the liquid welding pool and the containing system, the latter consisting of the weld beads already solidified, the cooled damming shoes and the edges of the plates to be welded. The particular rise of the bead upward conditions in a particular manner the evolution of these heat exchanges.

It is known that the input of heat is expressed by the formula $$Q = n \frac{60 \, E \, I}{v}$$

where
- $n$ is the arc efficiency, taking into consideration the heat dissipated by radiation; this efficiency is approximately 90 percent in the electrogas welding process;
- $E$ is the welding voltage;
- $I$ is the welding current in amperes;
- $v$ is the welding speed in centimeters per minute.

If we imagine that we can immobilize the welding operation at a given moment, we find the following situation (FIG. 2):
- in A there is a liquid phase of molten metal;
- in B there is a mushy phase of semi-solidified metal;
- in C the deposit is completely solidfied.

This illustrates that, contrary to a bead growing longitudinally, the calories leaking out toward the DD' zones of the work pieces being welded are particularly numerous since there is no heat by radiation through the upper surface of the B phase which is covered in vertical welding by the liquid phase A at the melting temperature.

It is therefore expected in this case that the compromise already mentioned involving danger of sticking or high dilution will be particularly critical and that the heat-affected zone will no longer have sufficient mechanical properties.

If we attempt to contain this "overheat" by reducing to a minimum the input heat Q, while retaining the electrical E and I at relatively high values (see FIG. 1) needed by reason, among others, of the relatively great length of the "stickout" of unsupported wires (60 to 80 mm in FIG. 1) in this process, we are inclined to prefer wires of such compositions as to permit high welding speeds compatible with the absence of sticking additions due to insufficient penetration.

If we further notice that the heat input during a given lapse of time is equal to the "melting heat" of the amounts of metal and flux melted during this time (the internal heat which must be entirely absorbed during the solidification) and that this melting heat is the multiplication of the specific heat by the mass and by the melting temperature, one will see that the limit speeds can be increased by acting not only on the mass and on the temperatures of the pools, but also by acting on their composition.

Most of the variations of the electrogas process patented to this date concern means of action on the masses or the temperatures, such as the chamfer designs, the reduction of the gap of the joint (the "narrow chamfer" process), the oscillation of the wire electrode, the distribution of the heat input in several locations by the use of multiple electrodes, directing the gas streams toward the edge of the work pieces to be welded (U.S. Pat. No. 3,610,867), agitating the pools by magnetic fields, even the two-step welding process for low alloy steels (Belgian Pat. No. 743,714) and, when particular compositions of electrodes have been considered, as in Belgian Pat. No. 797,542, said variations are not specific to automatic vertical welding and leave the welder the problems of adapting the vertical speed (electric paarameters, length of stick-out wires) to the limits of the overheat.

The present invention, on the contrary, introduces compositions of flux-cored wire - electrodes adapted to vertical automatic welding under gaseous protection and to very high welding speeds, so that the reduced heat input will not bring brittleness in the heat-affected zone.

$Q < 45$ K J/cm    with K in Kilograms said J in Joules.

The flux-cored wire electrodes as per the invention may comprise a metallic sheath which contains a core having the following compositions and proportions (in % of the weight of powder):

| | |
|---|---|
| 50 to 80% | of metallic filling (iron powder); |
| 2 to 8% | of fluxes in the form of silico-fluoride of potassium, of cryolite and/or micaceous iron oxide; |
| 9 to 22% | of alloying components (metallic additions) such as nickel powder, ferro-alloys (ferro-molybdenum, ferro-manganese, etc.); |
| 1.5 to 9% | of arc stabilizing deoxidizers such as FeSi, FeTi, SiCa; |
| 2 to 7% | of slag-forming agents in the form of fine silicia; | all in proportions such that the ratios of powders to strips are from 27 to 37 grams of powder to 100 grams of strip.

We have used the particular formula hereafter for the composition of the flux filling:

| | |
|---|---|
| Iron powder | 73% in powder weight |
| Silicofluoride of potassium ($K_2SiF_6$) | 4% in powder weight |
| Cryolite ($Na_3AlF_6$) | 2% in powder weight |
| Nickel powder | 3% in powder weight |
| Ferro-molybdenum (at 65 up to 75%) | 0.8% in powder weight |
| Refined ferromanganese (85 up to 90%) | 9.9% in powder weight |
| Ferrosilicon (45%) | 1% in powder weight |
| Ferrotitanium (30%) | 0.5% in powder weight |
| Micaceous iron oxide | 1% in powder weight |
| Fine silica | 4% in powder weight |
| Silicocalcium (Si—Ca) | 0.8% in powder weight |
| | 100.0% | with 32 grams of powder for 100 grams of low carbon steel strip.

By using this in the following conditions:

| Preparation | 1.6 mm diam. Butt gap 7 mm | 2.4 mm – 3.2 mm diam. with V chamfer |
|---|---|---|
| Thickness - mm | 20 | 20 |
| Current - Amp. | 320 | 700 up to 750 |
| Arc voltage | 43 | 40 up to 45 |
| Welding speed in meters per hour | 8.40 | 10 | we have obtained Charpy V-impact strengths higher than 4 Kg/cm$^2$ at −20° C in the heat-affected zone for some dispersoid type steels, an excellent penetration avoiding both sticking and an excessive dilution in the compromise and a very good-looking smooth and even deposit having homogeneous crystallization, all with melting speeds reaching 20 kilograms per hour for the 2.4 mm diameter wire.

These tests are made according to the general arrangement of FIG. 1 in which:

1 — Flux-cored wire
2 — Wire-feeding rolls
3 — Wire-guide nozzle
4 — Gaseous protection
5 — Liquid metal pool
6 — Water-cooled shoes
7 — Work pieces to be welded
8 — Weld bead
9 — Stick-out wire.

Figure 2:
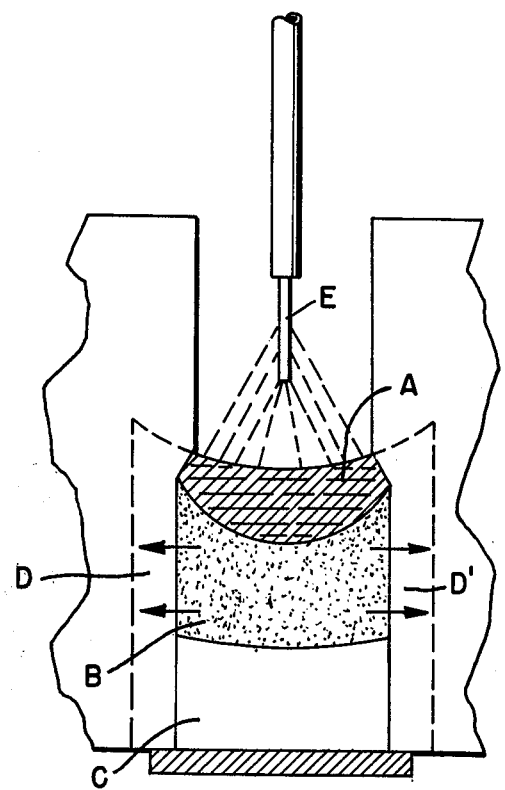

FIG. 2 is an enlargement of the cross section of the pieces to be welded in the molten weld pool with A — Liquid phase (pool)
B — Mushy phase during solidification
C — Weld bead already solidified
DD' — Heat-affected zone
E — Stick-out wire.

Considered broadly, my invention involves a flux-cored wire-electrode for vertical automatic welding, from bottom to top, with an electric arc under gaseous protection, the wires having diameters from 1 to 4 mm and being generally shaped internally in any configuration, such as tubular, heart-shaped or composite, in which the electrode has a sheath of metal strip and a powdered filling flux having the following quantitative and qualitative composition (in powder weight):

| | | |
|---|---|---|
| 1. | Iron powder: | 50 to 80% |
| 2. | Slag forming ingredients of the group consisting of potassium silicofluoride, cryolite and micaceous iron oxide: | 2 to 8% |
| 3. | Alloying elements of the group consisting of nickel powder, ferromolybdenum, ferrochromium and/or ferromanganese: | 12 to 42% |
| 4. | Arc stabilizing ingredients of the group consisting of ferrosilicon, ferrotitanium, and silicocalcium: | 1.5 to 9% |
| 5. | Slag forming agents such as fine silica: | 2 to 7% |

The electrode has a filling with a coefficient of preferably 30 to 34 grams of powder weight per 100 grams of strip.

In the preferred embodiment, the flux-cored wire-electrodes have a composition of filling powder flux characterized by the following formula in powder weight:

| | | | |
|---|---|---|---|
| Iron powder | | 72 to | 74% |
| $K_2SiF_6$ | | 3 to | 5% |
| $Na_3AlF_6$ | | 1 to | 3% |
| Nickel powder | | 2 to | 4% |
| Ferromolybdenum | optionally | 0 to | 1.8% |
| FeMn | | 8.9 to | 10.9% |
| FeSi (45%) | optionally | 0 to | 2% |
| FeTi (30%) | optionally | 0 to | 1.5% |
| Micaceous $Fe_2O_3$ (93%) | optionally | 0 to | 2% |
| Fine silica | | 3 to | 5% |
| SiCa | optionally | 0 to | 1.8% |

The flux-cored wire-electrodes of vertical automatic welding from bottom to top with an electric arc with gaseous protection, may have wires of diameters between 1 and 4 mm and generally shaped internally to any configuration and characterized by a sheath of steel strip, and as part of the interior powder in the following percentages of it, slag-forming ingredients in the group including potassium silicofluoride, cryolite and micaceous iron oxide of 2 to 8percent, alloying elements such as nickel powder, ferromolybdenum and ferromanganese of 12 to 42percent, arc stabilizing materials such as FeSi, FeTi and SiCa of 1.5 to 9percent and slag-forming agents of the type of fine silica of 2 to 7percent.

In the preferred embodiment of this, the particular ranges of particular ingredients is as already previously given above, starting with iron powder 72 to 74percent and $K_2SiF_6$ 3 to 5percent.

In view of my invention and disclosure, variations and modifications to meet individual preference or particular need will doubtless become evident to others skilled in the art to obtain all or part of the benefits of my invention without copying the apparatus shown, and I, therefore, claim all such insofar as they fall within the reasonable spirit and scope of my claims.

Having thus described my invention what I claim as new and desire to secure by letters Patent is:

1. Flux-cored wire-electrode for vertical automatic welding, from bottom to top, with an electric arc under gaseous protection, the wires having diameters from 1 to 4 mm and generally shaped internally in any configuration such as tubular, heart-shaped or composite, characterized by:

a. a sheath of steel strip;
b. a powdered filing flux having the following qualitative and quantitative composition (in powder weight):

| | | |
|---|---|---|
| (1) | Iron powder | 3% |
| (2) | Silicofluoride of potassium ($K_2SiF_6$) | 4% |
| (3) | Cryolite ($Na_3AlF_6$) | 2% |
| (4) | Nickel powder | 3% |
| (5) | Ferro-molybdenum (at 65 up to 75%) | 0.8% |
| (6) | Refined ferromanganese (85 up to 90%) | 9.9% |
| (7) | Ferrosilicon (45%) | 1% |
| (8) | Ferrotitanium (30%) | 0.5% |
| (9) | Micaceous iron oxide | 1% |
| (10) | Fine silica | 4% |
| (11) | Silicocalcium | 0.8% |

2. An electrode of claim 1, in which the sheath and the flux are in the proportion of 32 grams of powder for 100 grams of low carbon steel strip.

3. Flux cored wire electrode for vertical automatic welding, from bottom to top, with an electric arc under gaseous protection, the wires having diameters from 1 to 4 mm, characterized by:
a. a sheath of steel strip
b. a powdered filling flux having the following qualitative and quantitative composition, in powder weight:

| | | |
|---|---|---|
| Iron powder | 72 to | 74% |
| $K_2SiF_6$ | 3 to | 5% |
| $Na_3AlF_6$ | 1 to | 3% |
| Nickel powder | 2 to | 4% |
| FeMo | 0 to | 1.8% |
| FeMn | 8.9 to | 10.9% |
| FeSi | 0 to | 2% |
| FeTi | 0 to | 1.5% |
| Micaceous $Fe_2O_3$ | 0 to | 2% |
| Fine silica | 3 to | 5% |
| SiCa | 0 to | 1.8% |

4. Flux-cored wire electrode of claim 3, having a filling coefficient of from 30 to 34 grams of powder weight for 100 grams of strip.

5. Flux-cored wire electrodes for vertical automatic welding, from bottom to top, with an electric arc under gaseous protection, the wires having diameters from 1 to 4 mm and generally shaped internally in any configuration, such as tubular, heart-shaped or composite, characterized by:
a. a sheath of steel strip,
b. a powdered filling flux consisting of the following in powder weight:

| | | | |
|---|---|---|---|
| (1) | iron powder | 50 to | 80% |
| (2) | slag-forming ingredients of the group consisting of silicofluoride of potassium, cryolite and micaceous iron oxide | 2 to | 8% |
| (3) | alloying elements of the group consisting of nickel powder, ferromolybdenum, ferrochrome and/or ferromanganese | 12 to | 42% |
| (4) | arc stabilizing deoxidizers of the group consisting of ferrosilicon, ferrotitanium and silico-calcium | 1.5 to | 9% |
| (5) | slag-forming agents: fine silica | 2 to | 7% | c. the above powdered filling flux being in a proportion of from 30 to 34 grams of powder weight for every 100 grams of the above strip.

* * * * *